United States Patent [19]
Millett et al.

[11] Patent Number: 5,746,971
[45] Date of Patent: May 5, 1998

[54] METHOD OF PRODUCING LOW VOLATILITY AMINES FOR POWER PLANT PH CONTROL BY IN SITU HYDROLYTIC DECOMPOSITION OF A MORE VOLATILE AMINE WITH A RING STRUCTURE

[75] Inventors: Peter J. Millett, Half Moon Bay; Alan D. Miller, Pacifica, both of Calif.

[73] Assignee: Electric Power Research Institute, Inc., Palo Alto, Calif.

[21] Appl. No.: 794,200

[22] Filed: Jan. 24, 1997

[51] Int. Cl.[6] .................. C23F 11/04; C09K 3/00
[52] U.S. Cl. .................................. 422/16; 252/390
[58] Field of Search ................... 252/387, 389.32, 252/390; 422/16, 7

[56] References Cited

U.S. PATENT DOCUMENTS

| | | | |
|---|---|---|---|
| 2,562,549 | 7/1951 | Hatch | 422/16 |
| 3,671,447 | 6/1972 | Kowalski | 252/390 |
| 4,847,001 | 7/1989 | Cuisia et al. | 252/389.62 |
| 5,019,342 | 5/1991 | Muccitelli et al. | 422/16 |
| 5,141,716 | 8/1992 | Muccitelli et al. | 422/16 |
| 5,368,775 | 11/1994 | Rossi et al. | 252/392 |

*Primary Examiner*—Nina Bhat
*Attorney, Agent, or Firm*—Flehr Hohbach Test Albritton & Herbert LLP

[57] ABSTRACT

A method of producing low volatility amines for power plant pH control by in-situ hydrolytic decomposition of a more volatile amine with a ring structure. A ring amine having a certain molecular weight and a volatility is introduced into the pressurized water reactor. The ring amine undergoes at least partial in-situ hydrolytic decomposition to produce at least one daughter amine. The daughter amine has a molecular weight equal to or greater than the ring amine and has a volatility less than the ring amine. The daughter amine, and the mixture of the daughter amine and the ring amine act to control the pH in the reactor. In an alternative embodiment, the ring amine undergoes complete decomposition to form at least one daughter amine, and the daughter amine(s) acts to control the pH in the reactor.

18 Claims, 4 Drawing Sheets

Hydrolysis and Hydrogenation of Pyrrolidine

Thermodynamic Properties of Pyrrolidine and 4-Aminobutanol pH(T) in MSR for Varying Concentrations of 4-Aminobutanol and Pyrrolidine in the Final Feedwater

METHOD OF PRODUCING LOW VOLATILITY AMINES FOR POWER PLANT PH CONTROL BY IN SITU HYDROLYTIC DECOMPOSITION OF A MORE VOLATILE AMINE WITH A RING STRUCTURE

FIELD OF THE INVENTION

This invention relates generally to pH and corrosion control in a power plant. More particularly, the invention relates to a method of controlling the pH in a steam generating plant by in-situ hydrolytic decomposition of a parent ring amine to form daughter amines of equal or greater molecular weight and lower volatility than the parent amine.

BACKGROUND OF THE INVENTION

Pressurized water reactor (PWR) steam generators used in the power plant industry have adopted a number of different chemicals as additives for the control of pH to minimize corrosion of the carbon steel materials that comprise the construction of such plants. PH and corrosion control are particularly necessary in the secondary system components of such plants, such as in the condensate/feedwater train portions of the system. Historically, the choice of a chemical additive for pH control is based on a site specific evaluation.

In the industry, organic amines are favored as additives because they generally have lower vapor/liquid distribution coefficients and higher base strength as compared to other traditional volatile additives, such as ammonia. An important consideration for control of pH is the volatility of the chemical. In most power plants, a fraction of the high pressure steam is fully or partially condensed in the high pressure turbine and high pressure feedwater heater shells and recirculated back to the high pressure feedwater train without passing through a low pressure turbine. The rest of the steam is routed to one or more low pressure turbines. If most of the amine distributes in the high pressure portion of the steam cycle, an undesirable low pH will be achieved in the low pressure portion of the cycle. A low volatility amine will distribute to the liquid phase in the two phase regions of the PWR system, thereby elevating the pH of the low pressure portions.

Further, corrosion products accumulate in low-flow and flow restricted areas of the recirculating steam generators such as tube-tile support plate intersections and tube/tube sheet crevices and over horizontal surfaces such as the tube sheet. Ionic impurities can concentrate in localized areas causing highly corrosive conditions. Common additives such as ammonia, are very volatile and thus the neutralizing effect tends to stay with the steam phase as opposed to the water phase. As a result little protection is provided in the wet steam areas.

Additionally, organic amines are inherently unstable at PWR and fossil plant operating conditions. In the industry, decomposition of a parent amine has been considered deleterious since the resultant daughter amine(s) have had inferior properties and cause a decrease in the available concentration of the desired patent amine. Thus, it is desirable to provide a mixture of amines with different volatilities so that pH protection is achieved throughout both the high and low pressure parts of the system.

OBJECTS AND SUMMARY OF THE INVENTION

Accordingly, it is an object of this invention to provide a method of controlling pH and corrosion in a power plant.

More particularly, it is an object of this invention to provide a method of controlling the pH in a steam generating plant by decomposition of a parent amine to form a mixture of amines with desirable properties for pH control throughout various sections of the system.

A further object of the present invention is to provide a method for in-situ hydrolytic decomposition of a parent amine to form at least one daughter amine having a molecular weight equal to or greater than the patent amine, and a volatility lower than the parent amine.

A related object of this invention is to provide a method for the decomposition of a less costly parent amine to a more costly desirable daughter amine, thereby reducing the cost of treatment of the system.

These and other objectives are achieved by the method of controlling pH in a pressurized water reactor as herein disclosed. A ring amine having a certain molecular weight and volatility is introduced into the pressurized water reactor. The ring amine undergoes at least partial in-situ hydrolytic decomposition to produce at least one daughter amine. The daughter amine has a molecular weight equal to or greater than the ring amine and has a volatility less than the ring amine. The daughter amine, and the mixture of the daughter amine and the ring amine act to control the pH in the reactor. In an alternative embodiment, the ring amine undergoes complete decomposition to form at least one daughter amine, and the daughter amine(s) acts to control the pH in the reactor.

BRIEF DESCRIPTION OF THE DRAWINGS

Other objects and advantages of the invention become apparent upon reading of the detailed description of the invention provided below and upon reference to the drawings in which.

RELEVANT LITERATURE

The following Reports are relevant to the description of the invention herein disclosed and each Report is herein incorporated by reference: EPRI TR-100756 Project S409-11 June 1992; EPRI TR-100755 Project S409-2 July 1992; and EPRI TR-102952-R1 Project 2977 December 1994.

DETAILED DESCRIPTION OF THE INVENTION

Figure 1:
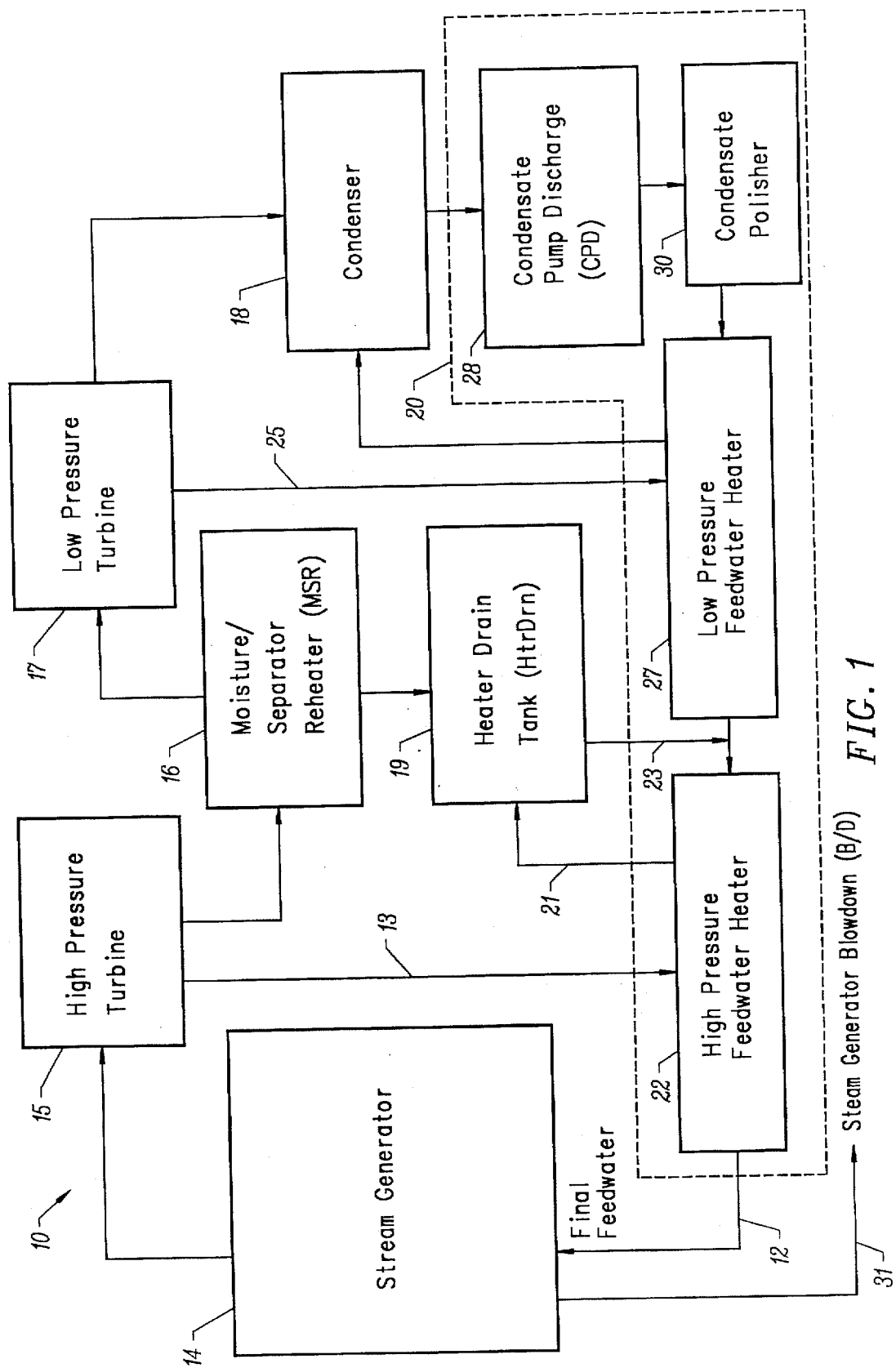
FIG. 1 is a block diagram of a pressurized water reactor secondary system which may be employed to practice the method of the present invention.

Turning to the drawings, wherein like components are designated by like reference numerals, FIG. 1 shows the secondary system of a conventional power plant in which the inventive method of controlling pH can be employed.

The secondary system 10 is a loop system and generally includes a steam generator 14 (also referred to as a PWR), a high pressure turbine 15, a moisture/separator reheaters (MSR) 16, one or more low pressure turbines 17 (only one is shown for simplification), condenser 18 and a condensate/feedtrain system 20. The final feedwater 12 enters the steam generator 14 where it is heated to form steam which may be superheated. The steam is sent to a high pressure turbine 15 where work is performed to generate electricity. A fraction of the high pressure steam may be fully or partially condensed in the high pressure turbine 15 and steam extracted is sent directly to the shell side of high pressure feedwater heaters 22 via line 13 and recirculated to the steam generator 14 without passing through the low pressure turbine 17. The remaining steam from the high pressure turbine 15 is routed to one or more low pressure turbines 17 via the MSR 16. The MSR 16 reheats any moisture in the low pressure steam before its entry into the low pressure turbine 17. A heater drain tank 19 (HtrDrn) captures any condensate from the MSR 16 and also provides storage of water from the high pressure feedwater heaters 22 via recirculation lines 21 and 23. Steam in the low pressure turbine 17 provides additional work. Steam extracted may be sent directly to the shell side of the low pressure feedwater heaters 27 via line 25. The steam discharged from the low pressure turbine 17 is sent to the condenser 18 where the steam is condensed and the resulting condensate is feed to the condensate/feedwater train 20.

The condensate/feedtrain system 20 generally includes a condensate pump (CPD) for discharge of a condensate stream from the condenser 18, and such stream is conveyed to a condensate polisher 30 where the ionic load and other impurities are removed from the condensate stream. The condensate stream is then recycled back to the steam generator 14 via a low pressure feedwater heater 27 and the high pressure feedwater heater 22. The outlet of the high pressure feedwater heater 22 is the final feedwater 12 to the steam generator 14. Thus, in the condensate/feedwater train 20 the condensate is polished to provide removal of ionic impurities as well as filtration of corrosion products, and fed to the feedwater heaters 27 and 22 to make up the final feedwater 12 for recirculation back to the steam generator 14. It is important to note that although a power plant is shown, the inventive method may be practiced using other types of plants such as those used in a fossil fuel plant, or in other nuclear power plants.

As described above, it is important to control the pH, and thus corrosion, throughout the entire system 10. The inventors have discovered that the introduction of certain amines having a ring structure directly into the final feedwater 12 of the system 10 provides product amines with desirable properties for optimal corrosion protection in the steam cycle. According to the method of the present invention, a ring amine is added to the system and undergoes partial or complete in-situ reaction to produce at least one product amine that has a lower volatility than the ring amine and a molecular weight that is equal to or greater than the ring amine. The ring amine is generally referred to as a "parent" and the product amine is generally referred to as a "daughter." Where the parent amine undergoes partial decomposition, a mixture of the parent and daughter amine will be present in the system, and will provide pH control throughout the system since they will distribute to different regions of the system based on their differing volatilities. Alternatively, where the parent amine undergoes complete decomposition, a plurality of daughter amines may be produced, each with differing volatilities which again promotes distribution and pH control throughout the system. In yet another embodiment, the parent may undergo complete decomposition to produce one daughter amine having desirable volatility properties.

Of particular advantage, the parent ring amine undergoes hydrolytic decomposition to produce at least one highly desirable amine of similar molecular weight to the parent, but with a lower volatility than the parent. The inventive method provides for the selection of a particular class of amines having ring structures which undergo in-situ hydrolysis to produce desired products with lower volatility and equal or greater molecular weight. Specifically, the parent ring structure is broken apart and then undergoes hydrolysis, to form reaction products having a molecular weight equal to or greater than the parent.

Of particular importance is the selection of the parent amine. The parent amine is selected from a group of amines having a ring structure. The ring structure is comprised of a plurality of carbon atoms. Preferably, the number of carbon atoms making up the ring will range from 3 to 6 carbon atoms, with four carbon atoms being most preferred. In an exemplary embodiment of the invention, the parent ring amine is selected from the group consisting of azetidine, pyrrolidine, quinuclidine, piperazine, and 3-hyroxyquinuclidine. The parent ring amines finding use in the invention may have a molecular weight ranging from about 60 to 100.

Figure 2:
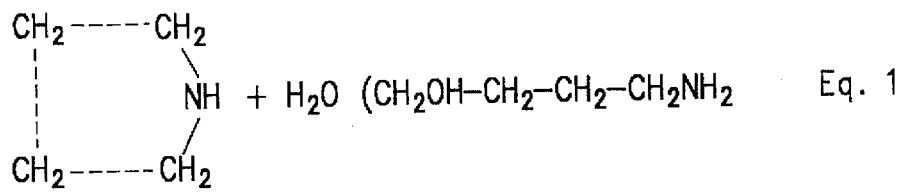
FIG. 2 illustrates two hydrolytic decomposition mechanisms for a ring amine in accordance with one embodiment of the present invention.
Figure 2:
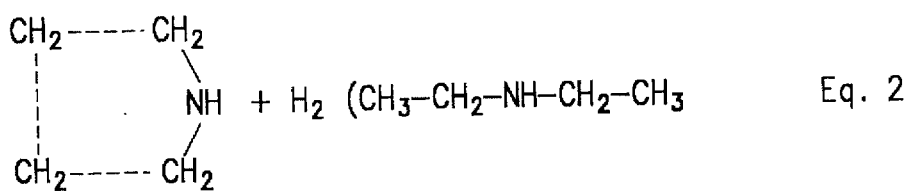

The parent ring amine undergoes at least partial in-situ hydrolytic decomposition to form at least one daughter amine. The daughter amine will have a molecular weight equal to or grater than the parent. Daughter amines may have a molecular weight ranging from about 75 to 120. In the preferred embodiment, pyrrolidine is selected as the parent amine. Pyrrolidine is relatively inexpensive and presents no significant handling problems. Two in-situ hydrolytic decomposition mechanisms for pyrrolidine are shown in FIG. 2. The first decomposition mechanism produces the desired by-product daughter amine 4-aminobutanol (Eq. 1). The second decomposition mechanism produces the by-product daughter amine diethylamine (Eq. 2). Both daughter amines will contribute to pH control. In an alternative embodiment, the parent amine azetidine forms 5-aminopentanol. In yet another embodiment, the parent amine piperazine forms 3-aminopropanol.

Of further importance is the thermodynamic properties of the parent and daughter amines, particularly their volatility. According to the method of the present invention, the parent amine will have greater volatility than the product daughter amines to promote differing distribution throughout the steam cycle. As the parent ring amine decomposes it distributes to certain areas of the steam cycle according to its volatility, and as the daughter amine is formed, it distributes to differing areas of the steam cycle according to its volatility. Thus, pH protection is afforded throughout the steam cycle of the secondary system 10. Generally, the parent ring amines will have a volatility distribution coefficient at a temperature of 200° C. ranging from about 5 to 30, while the daughter amines will have a volatility distribution coefficient at a temperature of 200° C. ranging from about 0.05 to 0.2.

Figure 3:
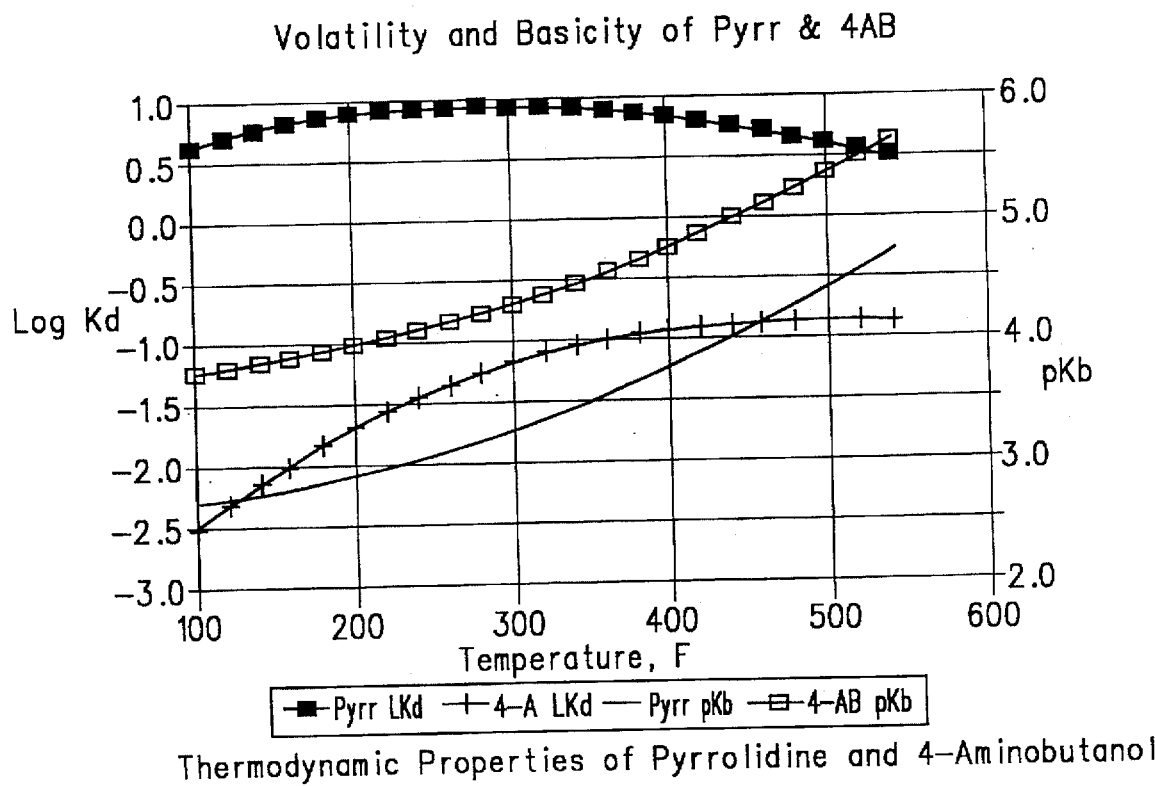
FIG. 3 graphically shows the thermodynamic properties of volatility and basicity as a function of temperature for a parent and daughter amine combination in accordance with one embodiment of the present invention.

The thermodynamic properties of a parent-daughter combination according to the preferred embodiment of the present invention are presented in FIG. 3. Specifically, pyrrolidine (the parent) and 4-aminobutanol (the daughter) are shown, where "pyrr $pK_b$" and "4-AB $pK_b$" are the base ionization constants for pyrrolidine and 4-aminobutanol, respectively; and "pyrr $LK_d$" and "4-AB $LK_d$" are the volatility as measured by the log of the distribution coefficient $LK_d$ of pyrrolidine and 4-aminobutanol, respectively. As shown, the base strength of pyrrolidine, as measured by decreased pKb, is much higher than that for 4-aminobutanol. At 400° F., the pKb of pyrrolidine is approximately 3.79 while that for 4-aminobutanol is approximately 4.78. Since the $pK_b$ values relate to logarithms of concentrations, this difference is very significant.

The volatility of pyrrolidine is quite high when compared to that of 4-aminobutanol. At 400° F., the LKd of pyrrolidine is approximately 0.85, while that of 4-aminobutanol is approximately −0.91. Additional information regarding volatility and basicity properties of the amines are described in the following three reports: EPRI TR-100756 Project S409-11 June 1992; EPRI TR-100755 Project S409-2 July 1992; and EPRI TR-102952-R1 Project 2977 December 1994, and each Report is herein incorporated by reference.

Figure 4:
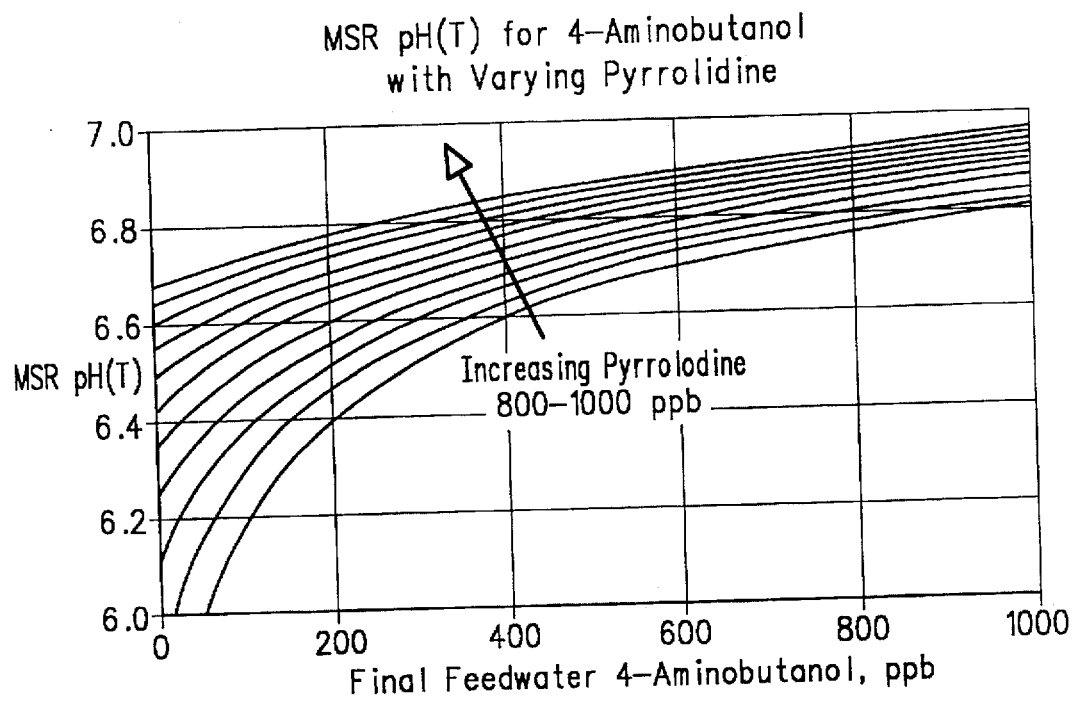
FIG. 4 shows the relationship between the concentration of the input parent amine and the resultant concentration of the daughter amine in the final feedwater as a function of pH.
Figure 6:
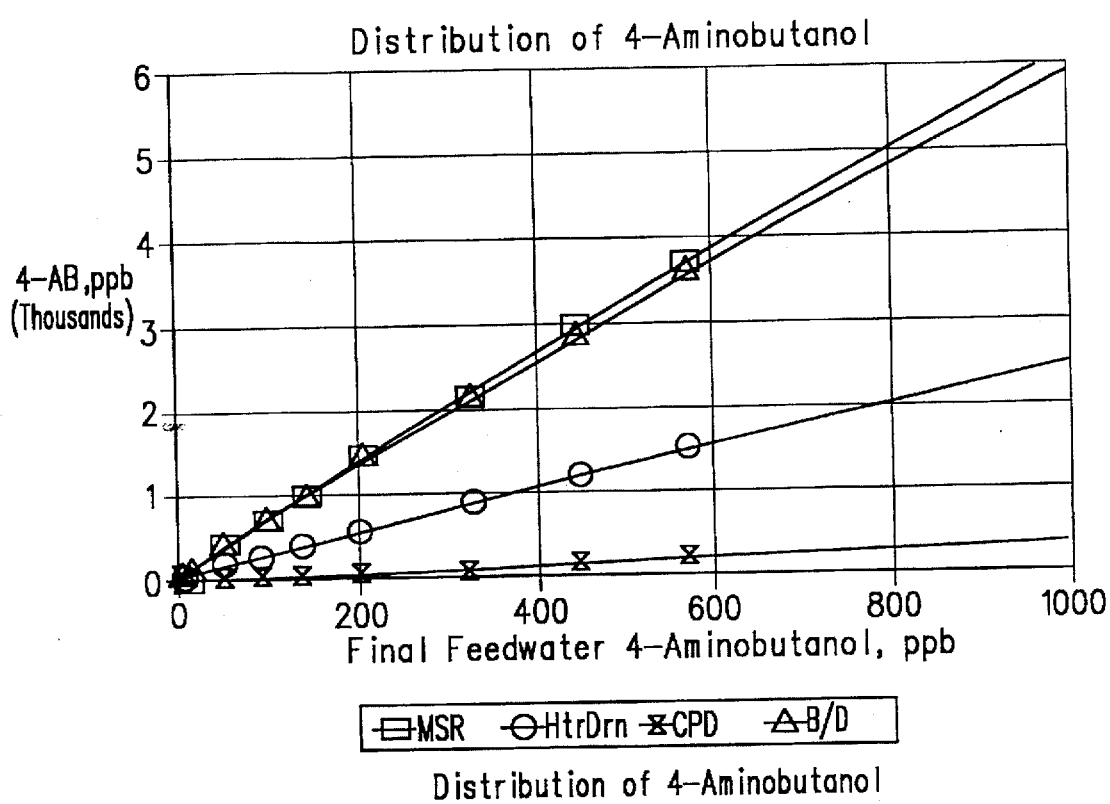

To control the pH, the present invention provides for the addition of certain amines to provide corrosion control within the system by maintaining a certain pH throughout various parts of the system. Preferably, the pH will be in the range of approximately 6.6 to 7.0 at an operating temperature of about 200° C., more preferably the pH is in the range of approximately 6.8 to 7.0, with a minimum pH of 6.6 being preferred. An optimum pH control program would produce a pH(T) (i.e. at operating temperature) measured at the MSR 16 in secondary system 10 of at least 6.6. FIG. 4 illustrates the relationship between the concentrations of pyrrolidine and 4-aminobutanol in the final feedwater 12 at a function of pH(T) that would be present in the MSR 16. Specifically, as shown in FIG. 4, concentrations of only 400 ppb of 4-aminobutanol, 800 ppb of pyrrolidine, or some combination of the two is required in the final feedwater to give the desired pH(T) in the MSR. Such low dosing concentrations offers several benefits. Reduced cost is obviously a benefit. Further, the low dosing concentration decreases the ionic loading on the condensate polishers 30. For comparison, in a typical method using ethanolamine as the additive amine, the power plant is usually limited, due to the ability to regenerate the polishers 30, to a concentration of about 2 ppm ethanolamine in the final feedwater 12. This results in a concentration of 1.2 ppm in the condensate ( or 16 lb/hr). This treatment scheme results in a pH(T) at the MSR of about 6.8. According to the present invention (as depicted in FIG. 6), this same protection can be achieved by only 0.9 ppm of 4-aminobutanol in the final feedwater 12, which translates to only about 300 ppb returned to the condenser 18 (or 4.2 lb/hr). As such, this is a fivefold decrease in the condensate polisher loading as compared to the typical method. Moreover, this fivefold decrease means the regeneration frequency of the condensate polisher is reduced by a factor of five.

The degree of protection offered to the feedwater/condensate train 18 relative to the protection to the high temperature extraction system 13 depends on the thermodynamic and hydrolytic stability of the ring amine that is fed to the system. This stability is in part a function of system specific parameters that must be measured for individual plants. According to the method of the present invention, as the hydrolytic decomposition reaction rate of the parent amine increases, the extra protection offered to the feedwater/condensate train 20 increases. With 100% hydrolysis, maximum protection of the feedwater/condensate train 20 is produced while providing a pH(t) of about 6.8 in the MSR 16. This effect occurs because at 100% decomposition of the parent, the daughter is produced at a maximum concentration, and the daughter is of lower volatility and thus will preferentially distribute to the wet areas of the steam cycle, i.e. the feedwater/condensate train 20. At the same time, however, as the parent decomposes, the parent being of higher volatility will preferentially distribute to the steam areas of the cycle, i.e. the MSR 16.

EXPERIMENTAL

Figure 5:
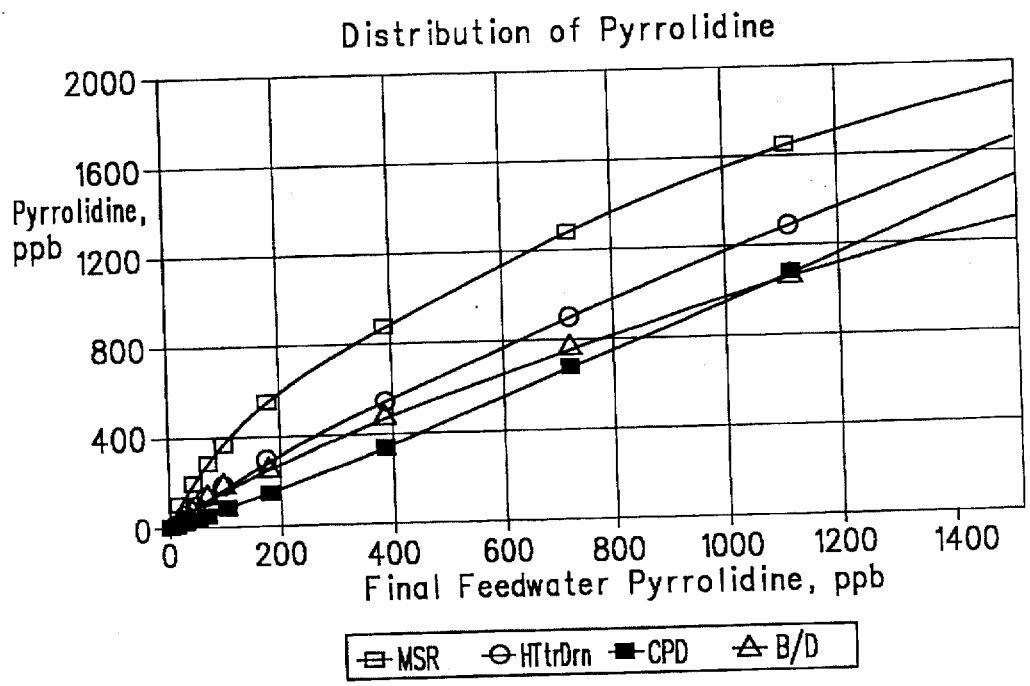
FIGS. 5 and 6 show the calculated distribution concentrations of a parent and daughter amine, respectively, measured at certain locations throughout the secondary system.

To illustrate the distribution of the amines throughout the steam cycle in accordance with the present invention, several prospective experiments were conducted and one embodiment of the invention is presented below. FIGS. 5 and 6 show the calculated distributions of both pyrrolidine and 4-aminobutanol. Due to its volatility property, the 4-aminobutanol preferentially distributes to the liquid in the high pressure parts of the steam cycle (e.g. upstream of the MSR 16). In contrast, the pyrrolidine preferentially distributes to the vapor phase, maintaining high concentrations in the low pressure parts on the system (e.g. downstream of the MSR 16). This observation is directly related to the volatility of the two amines.

To illustrate this difference FIGS. 5 and 6 show a comparison between the parent and daughter amine and where they would distribute in the secondary system 10. For the comparison each case is presented separately, meaning it is assumed there is no decomposition of the parent amine. Specifically, FIG. 5 shows the concentration of the parent amine at various points in the steam cycle for certain feedwater injection concentrations, assuming 0% decomposition of the parent amine. The y-axis shows the initial concentration in ppb of pyrrolidine injected into the system. Four measurements are taken at four locations distributed throughout the system to show the distributed concentration of the pyrrolidine. The four locations (as shown in FIG. 1) are: the MSR 16, the HtrDrn 19, the CPD 28 and the blowdown 31. As depicted, with pyrrolidine injected to achieve 800ppb in the final feedwater, the high volatility of pyrrolidine results in about 1000ppb of pyrrolidine in the condenser and condensate polishing system inlet. FIG. 6 illustrates the low volatility of 4 aminobutanol. With 800ppb of 4AB measured in the final feedwater, only about 400ppb is transported to the condenser. The concentration measured in the MSR drain is about 5000ppb.

Accordingly, it has been shown that a method is provided for control of the pH throughout the secondary system of a PWR power plant wherein a parent amine decomposes in-situ to provide at least one daughter amine having lower volatility and equal or higher molecular weight than the parent to promote distribution and thus pH control throughout the secondary system.

The foregoing description of specific embodiments of the invention have been presented for the purpose of illustration and description. They are not intended to be exhaustive or to limit the invention to the precise forms disclosed, and obviously many modifications, embodiments, and variations are possible in light of the above teaching. It is intended that the scope of the invention be defined by the claims appended hereto and their equivalents.

We claim:

1. A method of controlling pH in a power plant secondary system having a pressurized water reactor, comprising the steps of:

introducing a ring amine having a molecular weight and a first volatility distribution coefficient into said pressurized water reactor; and producing at least one daughter amine by at least partial in-situ hydrolytic decomposition of said ring amine, wherein said at least one daughter amine has a molecular weight equal to or greater than said ring amine and has a volatility less than said ring amine, and at least one of said daughter and said ring amines acts to control the pH.

2. The method of claim 1 wherein said first volatility distribution coefficient is in a range of approximately 5 to 30.

3. The method of claim 1 wherein said first molecular weight is in a range of approximately 60 to 100.

4. The method of claim 1 wherein said at least one daughter amine has a volatility in a range of approximately 0.05 to 0.2.

5. The method of claim 1 wherein said at least one daughter amine has a molecular weight in a range of approximately 75 to 120.

6. The method of claim 1 wherein said ring amine comprising a ring structure having a plurality of carbon atoms.

7. The method of claim 6 wherein said plurality of carbon atoms is in a range of 3 to 6.

8. The method of claim 1 wherein said ring amine is selected from the group consisting of azetidine, pyrrolidine, quinuclidine, piperazine, and 3-hyroxyquinuclidine.

9. The method of claim 1 wherein said ring amine is pyrrolidine.

10. The method of claim 1 wherein said at least one daughter amine is 4-aminobutanol.

11. The method of claim 1 wherein said at least one daughter amine is diethylamine.

12. The method of claim 1 wherein said at least one daughter amine further comprises a mixture of at least two daughter amines.

13. The method of claim 1 wherein said at least one daughter amine includes 4-aminobutanol and diethylamine.

14. The method of claim 1 wherein said pH is in the range of approximately 6.6 to 7.

15. The method of claim 1 wherein said ring amine is introduced at a concentration in a range of approximately 300 to 2000 ppm.

16. The method of claim 1 wherein the concentration of said at least one daughter amine is in a range of approximately 100 to 1000 ppm.

17. A method of controlling pH in a pressurized water reactor, characterized in that a ring amine having a molecular weight and a first volatility distribution coefficient is introduced into said pressurized water reactor, and at least one daughter amine is produced by at lest partial in-situ hydrolytic decomposition of said ring amine, wherein said at least one daughter amine has a molecular weight equal to or greater than said ring amine and has a volatility less than said ring amine.

18. A method of controlling pH in a power plant secondary system having a pressurized water reactor, comprising the steps of:

introducing pyrrolidine having a molecular weight and a first volatility distribution coefficient into said pressurized water reactor; and producing 4-aminobutanol by at least partial in-situ hydrolytic decomposition of said ring amine, wherein said 4-aminobutanol has a molecular weight equal to or greater than pyrrolidine and has a volatility less than pyrrolidine, and at least one of pyrrolidine and 4-aminobutanol act to control the pH.

* * * * *